United States Patent [19]
Jiles

[11] Patent Number: 6,126,369
[45] Date of Patent: Oct. 3, 2000

[54] HOT TAP TOOL

[76] Inventor: Stephen L. Jiles, 1513 Dogwood Ave., Anaheim, Calif.

[21] Appl. No.: 08/239,762

[22] Filed: May 9, 1994

[51] Int. Cl.$^7$ .................................................. B23B 47/18
[52] U.S. Cl. ........................... 408/101; 137/318; 408/92; 408/137
[58] Field of Search .................................. 408/79, 80, 92, 408/95, 101, 137, 138, 226, 238, 239 R; 137/318

[56] References Cited

U.S. PATENT DOCUMENTS

| | | | |
|---|---|---|---|
| 2,972,915 | 2/1961 | Milanovits et al. | 408/137 |
| 3,102,442 | 9/1963 | Black | 408/101 |
| 3,357,445 | 12/1967 | Daugherty | 408/137 |
| 3,905,718 | 9/1975 | Luckenbill et al. | 137/318 |

*Primary Examiner*—Daniel W. Howell

[57] ABSTRACT

A tool for tapping from a branch pipe into a main pipe to establish communication between the pipes. The tool has a bit for cutting a hole in the main pipe which is secured to an upstream end of a shaft for transmitting torque to the bit. The tool has a branch-engaging member engaged to the branch pipe adjacent to the downstream end of the branch pipe. The shaft has a threaded section engageable with a threaded section of the branch-engaging member so that as the shaft is rotated, the bit is driven along the longitudinal axis of the branch pipe toward the main pipe.

21 Claims, 4 Drawing Sheets

HOT TAP TOOL

BACKGROUND OF THE INVENTION

The invention pertains to devices for tapping or drilling from a branch line into a main line in a fluid transport system. More particularly, it pertains to a device for tapping into a hot or pressurized natural gas main without venting substantial amounts of gas to atmosphere.

In a natural gas delivery system, a main pipe, such as a street main, is typically buried underground. It is often necessary to connect a branch pipe to the main pipe to, for example, provide service to a newly constructed facility. To do this, the utility must excavate to reveal the main pipe and lay the branch pipe. A base section of the branch pipe having a predetermined length is secured and sealed at its upstream end to the main pipe. A drill may then be inserted through the downstream end of the base section for drilling a hole in the main pipe to permit communication with the branch pipe.

If this process is done while the main pipe remains pressurized, it is referred to as a hot tap (in distinction to a cold tap). In a hot tap, it is desirable that the tapping operation be conducted so as to minimize any discharge of gas to atmosphere for pollution, safety, and cost reasons.

It is additionally desirable that excavation costs and other associated labor costs be minimized and that the operation be conducted with the greatest possible ease. In particular, it is desirable to minimize the excavated space downstream of the base section of branch pipe which is necessary to allow for insertion and removal of the drill shaft from the branch pipe. It is furthermore desirable to minimize the space needed downstream of the pipe for men and equipment used to drive the drill bit both for the application of torque and the application of longitudinal force to bring the bit into engagement with the main pipe.

SUMMARY OF THE INVENTION

Accordingly, there is provided in practice of a preferred embodiment of the present invention, a hot tap tool having a shaft with a threaded section engageable with a threaded section of a branch pipe-engaging member so that as the shaft is rotated, a bit secured to the upstream end of the shaft is driven along the longitudinal axis of the branch pipe toward a main pipe.

BRIEF DESCRIPTION OF THE DRAWINGS

The features of a specific embodiment of the best mode contemplated of carrying out the invention are illustrated in the drawings, in which.

DETAILED DESCRIPTION

Figure 1:
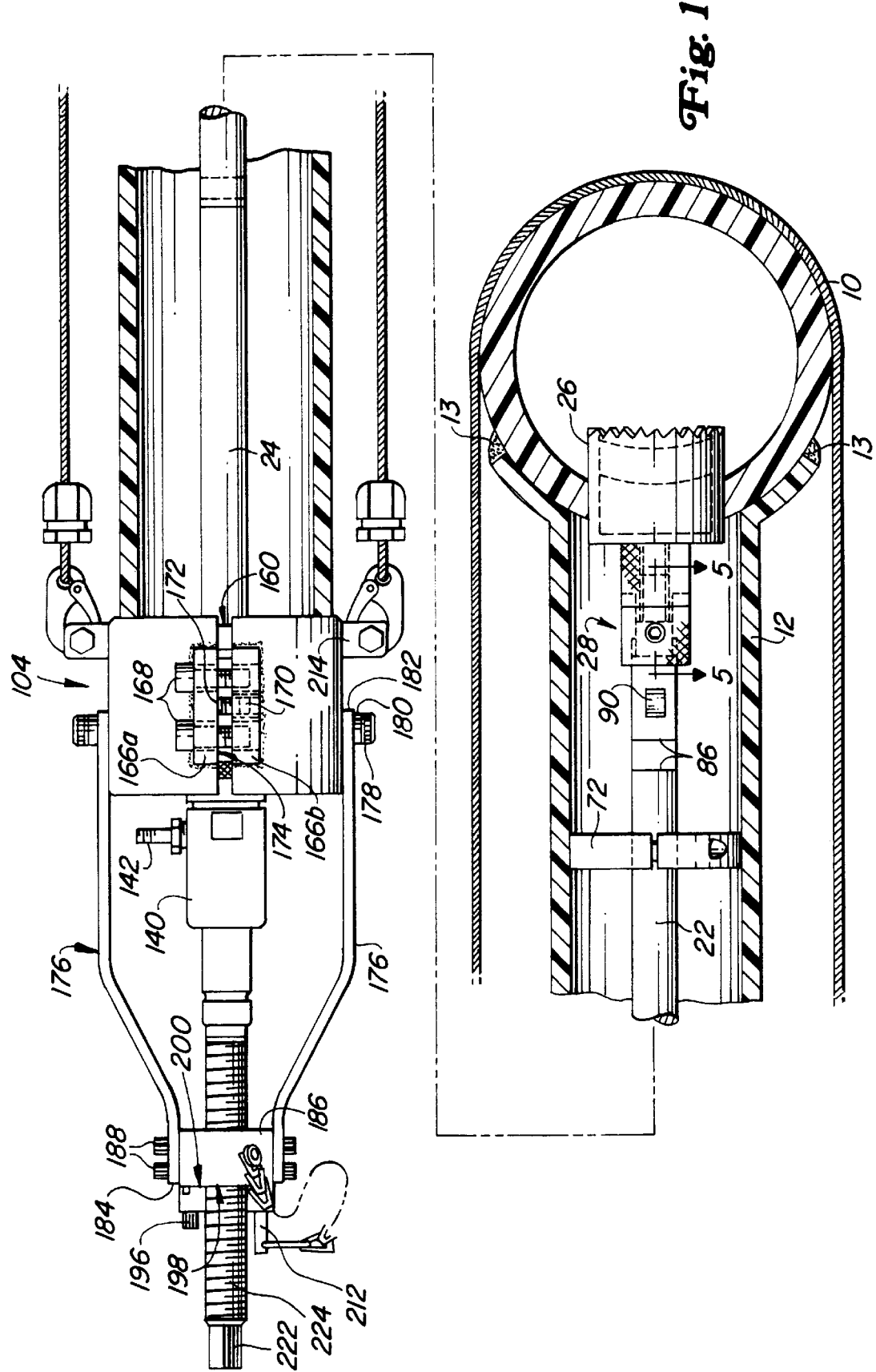
FIG. 1 is a side elevational view of a hot tap tool according to principles of the present invention with a main pipe and branch pipe of a natural gas delivery system shown in cross-section.

A main pipe 10 in a natural gas delivery system will typically be formed of materials such as PVC or the like and may, for example, be a standard street main serving residential, commercial or industrial consumers. A branch pipe 12 is secured and sealed to the main pipe at joint 13 such as by welding, chemically fusing or gluing.

A hot tap tool is used for drilling a hole in the main pipe to permit communication with the branch pipe. The hot tap tool is shown in the drawings situated in an operative position relative to the branch and main pipes. When described with reference to the drawings, the terms "upstream" and "downstream" designate directions/orientations/positions defined by the eventual gas flow from the main pipe through the branch pipe.

Figure 5:
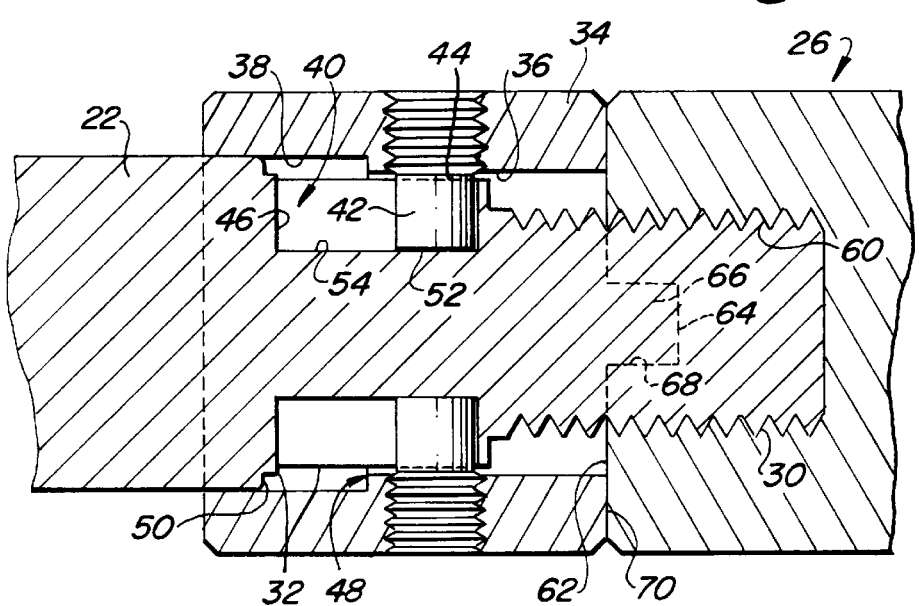
FIG. 5 is a cross-sectional view of a bit-holding fixture of the tool of FIG. 1, taken along line 5—5 in FIG. 1.

The hot tap tool has a two-piece shaft with an upstream piece 22 and a downstream piece 24. A saw-type drill bit 26 is secured to the upstream end 28 of the upstream shaft piece. A threaded portion 30 (FIG. 5) of the upstream shaft piece is formed adjacent its upstream end. Downstream of the threaded portion, is a section 32 having a radius smaller than the radius of the main body of the shaft immediately further downstream. An annular bit-holding fixture 34 has an upstream section having an internal surface 36 (FIG. 5) with a radius which is just slightly greater than the external radius of the shaft section 32 so that it is slidable over that section. The bit-holding fixture has a downstream section having an internal surface 38 with a radius which is just slightly larger than that of the main body of the shaft.

A pair of longitudinally extending diametrically opposed slots 40 are formed in the section 32. A pair of socket-head set screws 42 have threaded head portions engaging threaded holes in the bit-holding fixture and smooth pin portions which ride in the slots 40. Upstream travel of the bit-holding fixture is restricted by interaction of the set screws 42 with the upstream walls 44 of the slots 40 to define an upstreammost position of the fixture. Downstream travel of the bit-holding fixture is restricted by interaction of the set screws 42 with the downstream walls 46 of the slots 40 to define a downstreammost position. Additionally, downstream movement may be restrained by the interaction of a downstream annular shoulder 48, of the bit-holding fixture, which separates upstream and downstream sections 36 and 38, with an upstream facing annular shoulder 50 of the upstream shaft piece between the section 32 and the main shaft body.

The bit-holding fixture is firmly secured to the shaft by tightening the set screws 42 so that their end faces 52 bear against the bottoms 54 of the slots 40.

Figure 2:
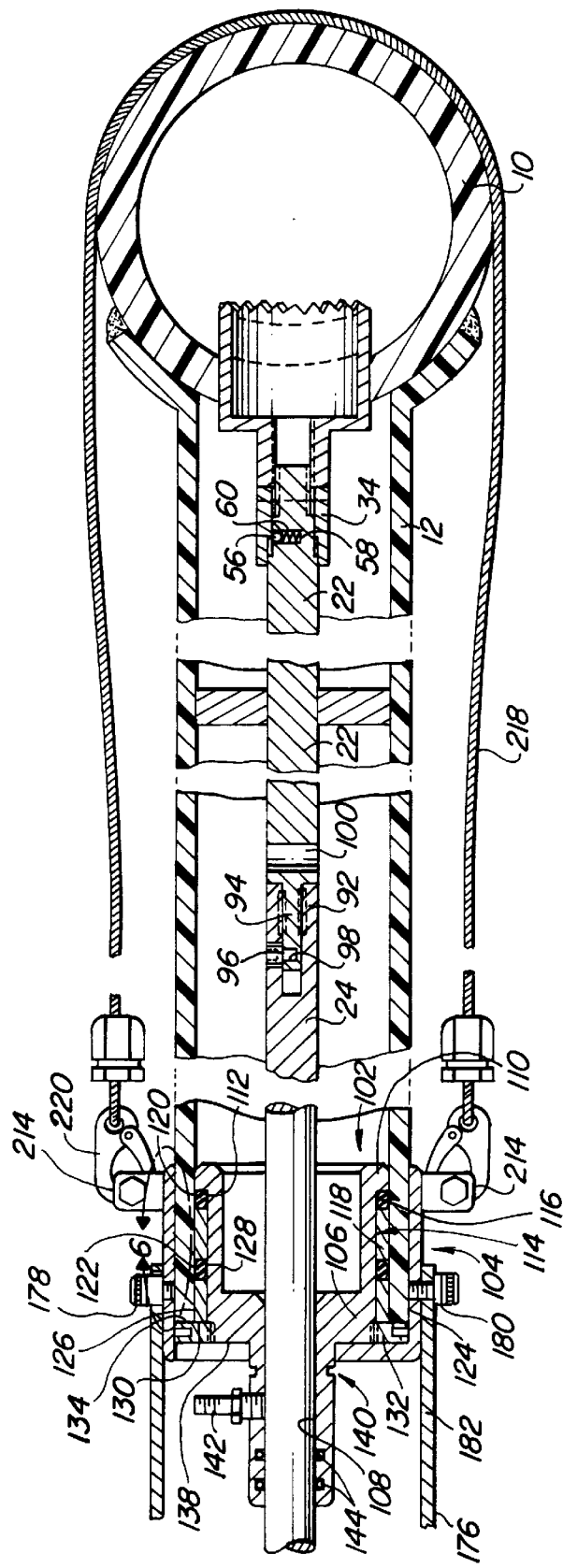
FIG. 2 is a partial cross-sectional view of the tool of FIG. 1.

As is shown in FIG. 2, to maintain a smooth and firm interaction between the bit-holding fixture 34 and shaft 22, a ball bearing 56 rides in a straight radial bore 58 in the section 32 supported by a spring 60. The ball bearing bears against the internal surface 36 of the upstream section of the bit-holding fixture and may interact with any detent or other feature provided in that surface.

To install the bit 26, the bit-holding fixture 34 is initially in a downstreammost position as described above. An internally threaded portion 60 (FIG. 5) of the bit is first screwed onto the threaded portion 30 of the shaft until the downstream end 62 of the bit comes into engagement with the upstream ends 64 of a pair of projections 66 which extend upstream from the bit-holding fixture. A pair of slots 68 are formed in the downstream end of the bit 22 and sized to accommodate the projections 66. The bit is then unscrewed or backed-off to the point where the slots 68 are aligned with the projections 66. The bit-holding fixture is then moved upstream until its upstream end 70 bears against the downstream end 62 of the bit and the projections 66 are accommodated in the slots 68. The set screws 42 are then tightened to secure the bit-holding fixture to the shaft. The engagement of the projections 66 with the slots 68 prevents the loosening of the bit 22 and thereby operatively couples the bit to the shaft.

Figure 4:
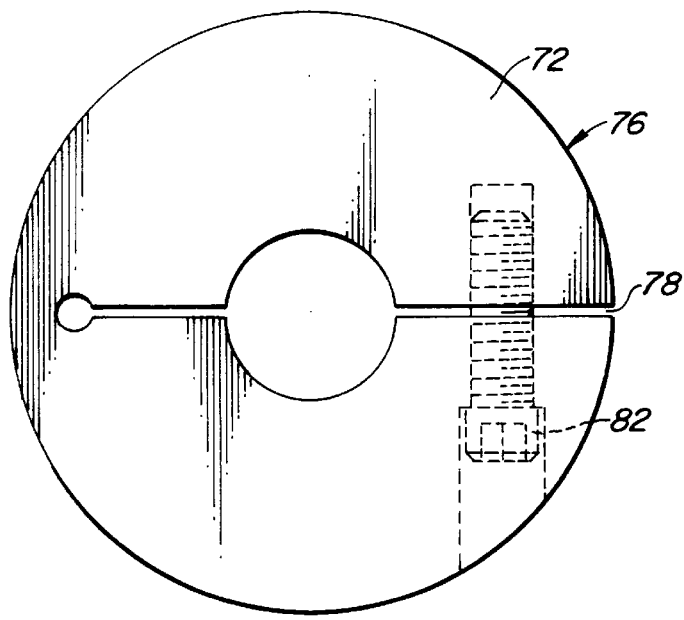
FIG. 4 is an end elevational view of a centering disc of the tool of FIG. 1.

As shown in FIGS. 1 and 4, a centering disk 72 is mounted on the main body of the upstream shaft piece 22 downstream of the bit-holding fixture. The disk has a central circular bore 74 sized to accommodate the shaft and an annular external surface 76 sized slightly smaller than the internal diameter of the branch pipe. A slot 78 extends radially from the periphery of the centering disk and continues from the bore into the body of the disk, terminating in a circular hole 80 between the bore 74 and the opposite periphery. The presence of the slot permits flexing of the centering disk to grip the shaft while the circular hole reduces stress concentrations at the terminus of the slot. A countersunk socket-head cap screw 82 spans the slot and may be tightened to firmly clamp the centering disk to the shaft.

As is shown in FIG. 1, one or more pairs of markings 86 are provided on the shaft to indicate a desired position for the centering disk. As the shaft of the hot tap tool may be used with more than one diameter of branch pipe, different size centering disks may be provided and, for each, a different pair of markings would correspond. For example, as shown in FIG. 1 a pair of markings 86 could correspond to a disk for use with a two inch nominal diameter branch pipe whereas the illustrated disk 72 as a diameter of approximate 3¹⁹⁄₃₂ inches for use with a nominal four inch pipe. As viewed in FIG. 1, the pair of markings for the four inch nominal pipe are hidden by the centering disk. A pair of flats 90 on opposite sides of the shaft may be provided to permit gripping of the shaft with a wrench.

As is shown in FIG. 2, the downstream end of the upstream shaft piece 22 and the upstream end of the downstream shaft piece 24 are threaded to each other. The downstream shaft piece has an internally threaded portion 92 which engages an externally threaded portion 94 of the upstream shaft piece. A socket-head set screw 96 has a threaded head portion engaging a threaded hole in the downstream shaft piece and a smooth pin portion which fits into a bore 98 formed in the downstream end of the upstream shaft piece 22. A transverse circular bore 100 is provided through the upstream shaft piece 22 just upstream of the threaded portion 94. A rod or other tool may be inserted into the bore when necessary to grip the upstream shaft piece 22.

As shown in FIG. 2, a fixture for engaging the branch pipe at its downstream end includes a plug 102 insertable into the end of the pipe and a cap 104 which is placeable over the end of the pipe to surround and encompass the pipe. The plug has a body 106 with a longitudinal bore 108 for receiving the shaft. At its upstreammost end, the plug body has an annular lip 110 having an external radius slightly smaller than the internal radius of the pipe. The annular lip has an annular downstream face 112 which joins a cylindrical outer surface portion 114 of the plug body immediately downstream of the lip and having an external radius smaller than that of the lip. An elastomeric upstream O-ring 116 encompasses the cylindrical outer surface portion 114 and abuts the downstream face 112 of the annular lip. An upstream sleeve 118 encompasses the cylindrical outer surface portion of the plug body and has an annular upstream face 120 abutting the upstream O-ring 116 and an annular downstream face 122 abutting an elastomeric downstream O-ring 124 which also encompasses the cylindrical outer surface portion.

A downstream sleeve 126 has an annular upstream face 128 abutting the downstream O-ring 124.

An internally threaded ring 132 is engageable with an externally threaded portion of the plug body immediately downstream of the cylindrical outer surface portion 114. The ring 132 has an external diameter slightly smaller than the external diameter of the branch pipe and has a perimeter surface which is provided with a knurled contour. The ring has an annular upstream face 134 which abuts an annular downstream face 130 of the downstream sleeve 126.

The plug body has an annular first downstream face 138 which connects the externally threaded portion of the body to a downstream neck portion 140 of the body. A SCHRADER-type valve 142 extends through the downstream neck portion and is open to the longitudinal bore 108.

Adjacent the downstream end of the downstream neck portion, a pair of elastomeric O-rings 144 ride in inwardly facing annular channels in the longitudinal bore and are engageable with the shaft to provide a seal between the plug body and the shaft.

Figure 3:
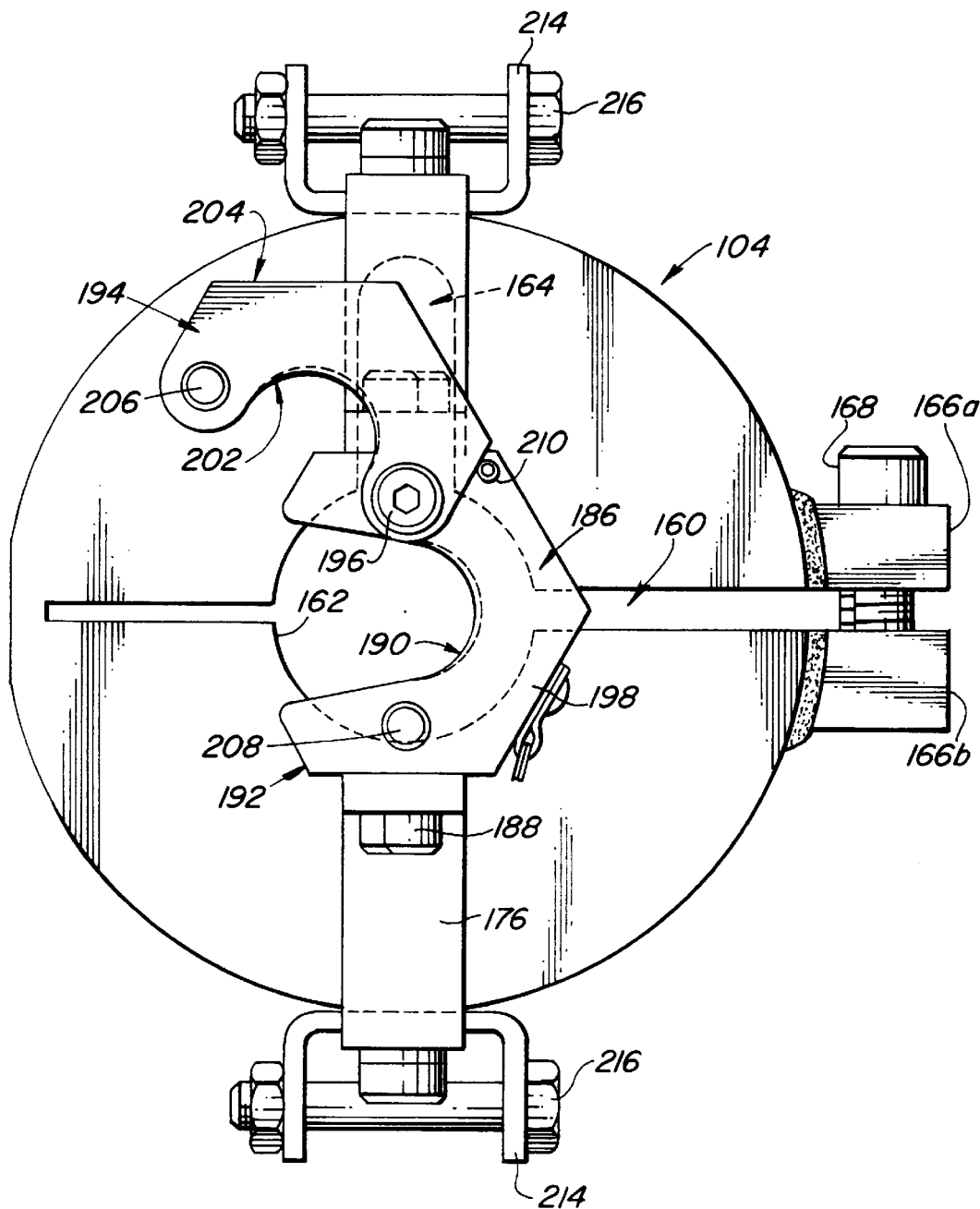
FIG. 3 is an end elevational view of a pipe cap and shaft-engaging fixture portion of the tool of FIG. 1.
Figure 6:
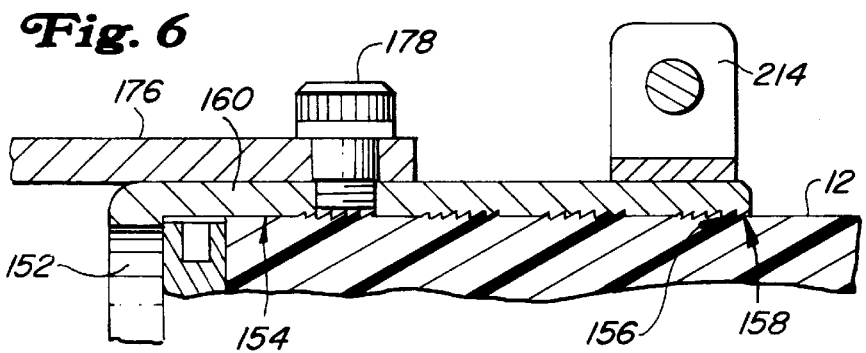
FIG. 6 is an enlarged view of the pipe cap portion of the tool of FIG. 2.

The cap 104 has an annular sleeve portion 150 which is open at its upstream end and its downstream end merges with an end plate portion 152 (FIGS. 2 and 6). The annular sleeve portion has an internal surface 154 having a diameter which is nominally equivalent to the external diameter of the branch pipe. The internal surface of the sleeve is formed with a plurality of circumferential serrations having downstream faces 156 perpendicular to the length of the pipe and upstream faces 158 at an angle thereto. As shown in FIGS. 1 and 3, a longitudinal slot 160 is formed through the sleeve from its upstream to downstream ends. The slot continues radially inward through the end plate 152 to join a central hole 162 which is sized to accommodate the neck portion 140 of the plug body. The slot continues radially outward from the central hole, terminating within the end plate 152 adjacent the internal surface of the annular sleeve portion 150. Perpendicular to the slot 160, a branch slot 164 extends from the central hole 162 and is sized to permit the passage of the valve 142 through the end plate.

A pair of bosses 166a and 166b are formed on the external surface of the sleeve portion 150 along either side of the slot 160. A pair of socket-head thumb screws 168 pass freely through holes in the first boss 166a and engage internally thread holes in the second boss 166b thus spanning the slot 160. A socket-head set screw 170 engages a threaded hole in the second boss 166b and has an end face 172 engageable with a flat surface 174 of the first boss which faces the slot 160. As is described further below, the socket-head thumb screws 168 may be used to draw the bosses 166 together to tighten the cap around the branch pipe, whereas the socket-head set screw 170 may be used to press the bosses apart to loosen the cap from the branch pipe.

A pair of arms 176 (FIGS. 1 and 3) are pivotally connected to the sleeve portion 150 by means of socket-head thumb screws 178 with washers 180 at the upstream ends of the arms. The arms are diametrically opposed and oriented circumferentially 90° from the slot 160. Each arm extends straight back from the sleeve portion 150, is bent to extend slightly inward and then bent to continue to extend downstream at its downstream end 184. Adjacent their downstream ends, the arms are secured to a first portion 186 of an internally threaded shaft-engaging fixture by means of two pairs of socket-head thumb screws 188. The first fixture portion 186 has an open longitudinal channel 190 (FIG. 3) which through an arc of slightly less than 180° is of circular profile and bears internal threading. The channel expands outwardly to merge with the perimeter surface 192 which beyond the channel is of substantially hexagonal section.

A second fixture portion 194 is pivotally mounted to the first by means of a socket-head thumb screw 196, a downstream face 198 of the first section abutting an upstream face 200 of the second section (FIGS. 1 and 3). The second fixture portion has an open longitudinal channel 202 which through an arc of slightly less than 180° is of circular profile and bears internal threading. The channel expands outwardly to merge with the perimeter surface 204 which beyond the channel is of substantially hexagonal section.

Diametrically opposite the screw 196, a hole 206 extends longitudinally through the second fixture portion. Similarly, a hole 208 extends into the first fixture portion from its downstream face. A pin 210 is permanently secured in a hole in the first portion and extends downstream from the downstream face and is engageable with the perimeter surface of the second fixture portion to restrict rotation of the second fixture portion relative to the first fixture portion, thus serving as a stop for limiting the degree to which the two portions may be opened relative to each other.

A locking pin 212 (FIG. 1) is insertable through the holes 206 and 208 of the fixture portions for securing the fixture portions in a closed orientation wherein their respective threaded portions are held diametrically opposed to each other. The locking pin has a spring loaded ball (not shown) for engaging the side of the hole 208 so as to secure the pin to the fixture when it is inserted through the holes.

A pair of U-shaped brackets 214 are secured at their bases to the external surface of the sleeve portion 150, adjacent its upstream end. A pair of bolts 216 extend through and between the arms of the U-shaped brackets and are oriented perpendicular to the axis of the branch pipe. A coated steel cable leash 218 has a pair of spring-loaded connector hooks 220 attached at its ends. The connector hooks may be placed over and secured to the bolts 216.

To set up and operate the hot tap tool, a user initially secures the bit to the bit-holding fixture on the upstream shaft piece and positions the centering disk accordingly, as described above. Thereafter, the user inserts the upstream shaft piece (or more precisely its downstream end) in a downstream direction through the bore 108 of the plug 102. The plug, upstream shaft piece and bit are then delivered as a unit to the downstream end of the branch pipe and the plug is inserted into the pipe so that the upstream face of the threaded ring 132 abuts the downstream end face of the pipe. The ring is then tightened to the plug body by hand and by means of a spanner wrench (not shown) engaging radial holes in the ring.

The tightening compresses the downstream O-ring against the downstream and upstream sleeves and the upstream O-ring against the upstream sleeve and downstream face of the annular lip so as to force the O-rings to expand radially outward to engage and seal with the internal surface of the branch pipe.

After the plug is thus internally engaged to the branch pipe, the cap 104 is placed over the plug so that its sleeve portion 150 encompasses the branch pipe at its downstream end external to the plug. The pair of socket-head thumb screws 168 are tightened to draw the bosses 166a and 166b toward each other causing the internal surface 154 of the annular sleeve portion to engage the external perimeter surface of the branch pipe. The circumferential serrations bite into the pipe surface to firmly engage the surface for resisting longitudinal movement of the cap relative to the pipe. The engagement of the cap with the pipe further resists any radial expansion of the pipe at its downstream end. The leash 218 is then loosely wrapped around the main pipe 10.

The upstream shaft piece and bit are then pushed through the branch pipe in an upstream direction until the downstream end of the upstream piece is adjacent the downstream end of the neck portion 140 of the plug. The downstream shaft piece is then screwed onto the upstream shaft piece and secured against rotation by means of the set screw 96. The shaft may be further pushed forward while being rotated to break any friction between the shaft and the plug via a box wrench (not shown) engaging a hexagonal cross-section head 222 (FIG. 1) formed at the downstream end of the downstream shaft piece. Any suitable handle may be used in place of the wrench, and any suitable gripping feature may be used in place of the hexagonal head. The shaft is pushed further until the bit 26 is adjacent or near the external surface of the main pipe 10. At this point, the shaft-engaging fixture 186, 194 may be rotated into engagement with the shaft and the two fixture portions closed so as to encompass the shaft about a threaded shaft portion 224 (FIG. 1) immediately upstream of the head 222, the threaded channels of the fixture portions engaging the threaded section 224 of the shaft.

Accordingly, it can be seen that as the shaft is rotated further (in a clock-wise or positive direction) the rotation will drive the bit further along the longitudinal axis of the branch pipe toward the main pipe without the application of external longitudinal force. The bit cuts into the pipe, being both rotated and driven longitudinally by the application of torque to the head 222. Once the bit has cut completely through the wall of the main pipe, there is no danger of puncturing the other side of the pipe as the shaft length is preselected relative to the length of the branch pipe to bar such an event.

With communication thus established between the main and branch pipes, the branch pipe will become pressurized, producing a downstream force on the plug. As described above, the engagement of the cap and its serrations with the pipe will securely hold the plug against downstream longitudinal movement. In this regard, the leash 218 further acts as a safety device, providing limits to any such movement should the cap disengage from the pipe.

After the communication is established, a negative torque is applied to the head so as to draw the bit away from the main pipe. Once the bit has disengaged from the main pipe, the shaft-engaging fixture may be disengaged from the downstream shaft section and the shaft pulled further downstream. Once the downstream end of the upstream shaft piece emerges from the plug, the upstream shaft piece may be removed and the downstream shaft piece pulled further out until the centering disc comes adjacent the plug. The branch pipe must be long enough to accommodate the clamp and permit the clamp to pinch the pipe closed without disturbing the branch-engaging fixture of the hot tap tool at the downstream end of the branch pipe.

With the cap and plug still engaged to the branch pipe, a large clamp (not shown) is used to pinch the branch pipe shut at a location upstream of the bit thereby interrupting communication between the main pipe and the downstream end of the branch pipe. The branch pipe must be long enough to accommodate the clamp and permit the clamp to pinch the pipe closed without disturbing the branch-engaging fixture of the hot tap tool at the downstream end of the branch pipe. At this point, gas pressure within the branch pipe is released through the valve 142. A pressure gauge is applied to the valve to then verify that no further gas is entering the branch pipe. Once this is assured, the screws 168 spanning the slot 160 of the cap are loosened and the set screw 170 tightened so as to press the two bosses away from each other and disengage the internal surface of the cap from the external surface of branch pipe. The leash is then disconnected and the cap removed. Subsequently, the plug may be removed by loosening the ring so as to relieve the pressure on the O-rings.

After the tool has thus been removed, the branch pipe may be connected to whatever structure lies downstream and the clamp disengaged to provide service.

As used herein, the directional terms downstream and upstream are used with reference to a preferred flow direction from a main pipe to a branch pipe in a natural gas delivery system. The present invention may, however, be used in other situations wherein it is necessary to tap from one pipe into another. Accordingly, the directional terms should not be read as requiring a given flow direction but rather as establishing the appropriate relative locations and orientations of the various elements. In general "downstream" in the context of the branch pipe is synonymous with closer to the main pipe.

The described embodiment of the invention is considered only to be preferred and illustrative of the inventive concept. Accordingly, the scope of the invention is not to be restricted to this embodiment. Various and numerous other arrangements may be devised by one skilled in the art without departing from the spirit and scope of this invention.

What is claimed is:

1. A tool for tapping from a branch pipe into a main pipe at an upstream end of the branch pipe, comprising:

a shaft for transmitting torque to a bit secured to an upstream end of the shaft for cutting a hole in the main pipe, said shaft having a first section and a second section, said first section comprising a threaded downstream end detachably engaging a threaded upstream end of the second section, wherein the upstream end of the first section is coupled to the bit; and a branch-engaging member engaged to the branch pipe adjacent a downstream end of the branch pipe, wherein the shaft has an externally threaded section engageable with a threaded section of the branch-engaging member so that as the shaft is rotated in a first direction, the bit is driven along a longitudinal axis of the branch pipe towards the main pipe.

2. The tool of claim 1 wherein the shaft further comprises a gripping feature adjacent a second end of the shaft for engagement by a handle for applying torque to the shaft for rotating the shaft about its longitudinal axis.

3. The tool of claim 2 wherein the gripping feature has a hexagonal cross section.

4. The tool of claim 1 further comprising a bit-holding fixture for securing the bit to an upstream end of the shaft and comprising a collar portion axially slidable along the shaft between an upstream and a downstream position comprising an upstream projection for engaging the bit when in the upstream position to rotatably secure the bit to the collar, the shaft passing through the branch-engaging member.

5. The tool of claim 4 further comprising a first set screw extending through the collar for engaging the shaft to secure the collar to the shaft against downstream movement when the collar is in the upstream position.

6. The tool of claim 1 further comprising a pin insertable into the first and second shaft sections for securing them against relative rotation.

7. The tool of claim 1 wherein the first shaft section has a transverse hole for receiving an arm for applying a relative torque between the first and second shaft sections.

8. The tool of claim 1 wherein the branch-engaging member comprises an internally threaded section having first and second sections selectively engageable with each other for closing to encompass the externally threaded section of the shaft about the longitudinal axis of the shaft and opening to permit disengagement of the externally and internally threaded sections.

9. The tool of claim 8 wherein the branch-engaging member further comprises:

a cap encompassing the end of the branch pipe; and a pair of arms, pivotally coupled to the cap at an upstream end of the each arm of the pair of arms and carrying the internally threaded section at a downstream end of each arm of the pair of arms.

10. The tool of claim 9 further comprising a leash extending around the main pipe and having first and second ends secured to the cap.

11. The tool of claim 1 wherein the branch-engaging member has a plug portion insertable into the downstream end of the branch pipe for selectively engaging and sealing with the branch pipe.

12. The tool of claim 11 wherein the plug portion comprises:

a body having a longitudinal bore for receiving the shaft, a cylindrical outer surface portion and an annular lip at an upstream end of the body having an external radius greater than the external radius of the cylindrical outer surface portion;

an elastomeric O-ring encompassing the cylindrical outer surface portion and abutting an annular downstream face of the annular lip; and an internally threaded ring engageable with an externally threaded body portion downstream of the cylindrical outer surface portion for compressing the O-ring against the annular downstream face of the annular lip so as to force the O-ring radially outward to engage and seal with an internal surface of the branch pipe.

13. The tool of claim 12 wherein the O-ring is a first O-ring and the plug further comprises:

a second elastomeric O-ring;

a first annular sleeve having an annular upstream face abutting the first O-ring and an annular downstream face abutting the second O-ring; and a second annular sleeve having an annular upstream face abutting the second O-ring.

14. The tool of claim 13 wherein the branch-engaging member further comprises a cap portion encompassing the branch pipe at its downstream end and having an internal surface engageable with an external perimeter surface of the branch pipe for resisting radial expansion of the branch pipe.

15. The tool of claim 14 wherein the internal surface of the cap portion bears annular serrations for engaging the external perimeter surface of the branch pipe for resisting longitudinal movement of the cap relative to the branch pipe.

16. The tool of claim 15 wherein the cap comprises a longitudinal slot and wherein the branch-engaging member further comprises a pair of screws spanning the slot for securing the cap to the branch pipe.

17. The tool of claim 16 wherein the branch-engaging member further comprises a set screw spanning the slot for expanding the slot for disengaging the cap from the branch pipe.

18. The tool of claim 1 further comprising means for centering the bit within the branch pipe comprising a disk secured to the shaft downstream of the bit, the shaft passing through the branch-engaging member.

19. The tool of claim 18 wherein the disk is a first disk and wherein a second disk is interchangeable with the first disk, the second disk having an external diameter different from that of the first and adapted for use with a different diameter of branch pipe than is the first and wherein the shaft bears markings for a first operable position for the first disk and a second operable position for the second disk.

20. The tool of claim 19 wherein the external diameter of the second disk is smaller than that of the first and wherein the first operable position is downstream of the second.

21. The tool of claim 5 further comprising a second set screw diametrically opposed to the first set screw and extending through the collar for engaging the shaft to secure the collar to the shaft against downstream movement when the collar is in the upstream position and wherein the first and second set screws ride in first and second longitudinal slots, respectively, in the shaft and are engageable with upstream ends of the first and second slots for limiting upstream movement of the collar.

* * * * *